United States Patent
Fukumoto

(10) Patent No.: US 6,466,593 B1
(45) Date of Patent: Oct. 15, 2002

(54) VARIABLE PATH LENGTH PASSIVE Q SWITCH

(75) Inventor: Joseph M. Fukumoto, Rancho Palos Verdes, CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/563,073

(22) Filed: Apr. 24, 2000

Related U.S. Application Data

(63) Continuation-in-part of application No. 09/478,229, filed on Jan. 6, 2000, now Pat. No. 6,344,920.

(51) Int. Cl.[7] .............................. H01S 3/11; H01S 3/113; H01S 3/098; H01S 3/08
(52) U.S. Cl. .............................. 372/10; 372/11; 372/18; 372/100; 372/101; 372/107
(58) Field of Search ............................. 372/10, 11, 42, 372/18, 100, 101, 107

(56) References Cited

U.S. PATENT DOCUMENTS 5,303,256 A * 4/1994 Sumida ...................... 372/106

* cited by examiner

Primary Examiner—Paul Ip
Assistant Examiner—Armando Rodriguez
(74) Attorney, Agent, or Firm—Colin M. Raufer; Leonard A. Alkov; Glenn H. Lenzen, Jr.

(57) ABSTRACT

A passive Q switch. The inventive Q switch includes a first wedge of material adapted to absorb electromagnetic energy. The first wedge has a first thickness on a first end thereof and a second thickness on a second end thereof diametrically opposite the first end. The first wedge has a first surface connecting the first and second ends and a second surface connected the first and second ends. The second surface is slanted relative to the first surface. A second wedge of material is included in the inventive passive Q switch. As per the first wedge, the second wedge has a first thickness on a first end thereof and a second thickness on a second end thereof diametrically opposite the first end. The second wedge has a first surface connecting the first and second ends and a second surface connecting the first and second ends. The second surface is slanted relative to the first surface. The second surface of the first wedge is mounted in optical alignment with the second surface of the second wedge and in a plane parallel thereto. In the illustrative embodiment, the wedges are made of chromium:yttrium aluminum garnet ($Cr^{+2}$:YAG) and mounted to allow the first and second wedges to translate relative to each other while maintaining a constant distant 'd' between the second surfaces thereof. The inventive Q-switch allows for a variable thickness and lasing hold off in a passive arrangement.

5 Claims, 5 Drawing Sheets

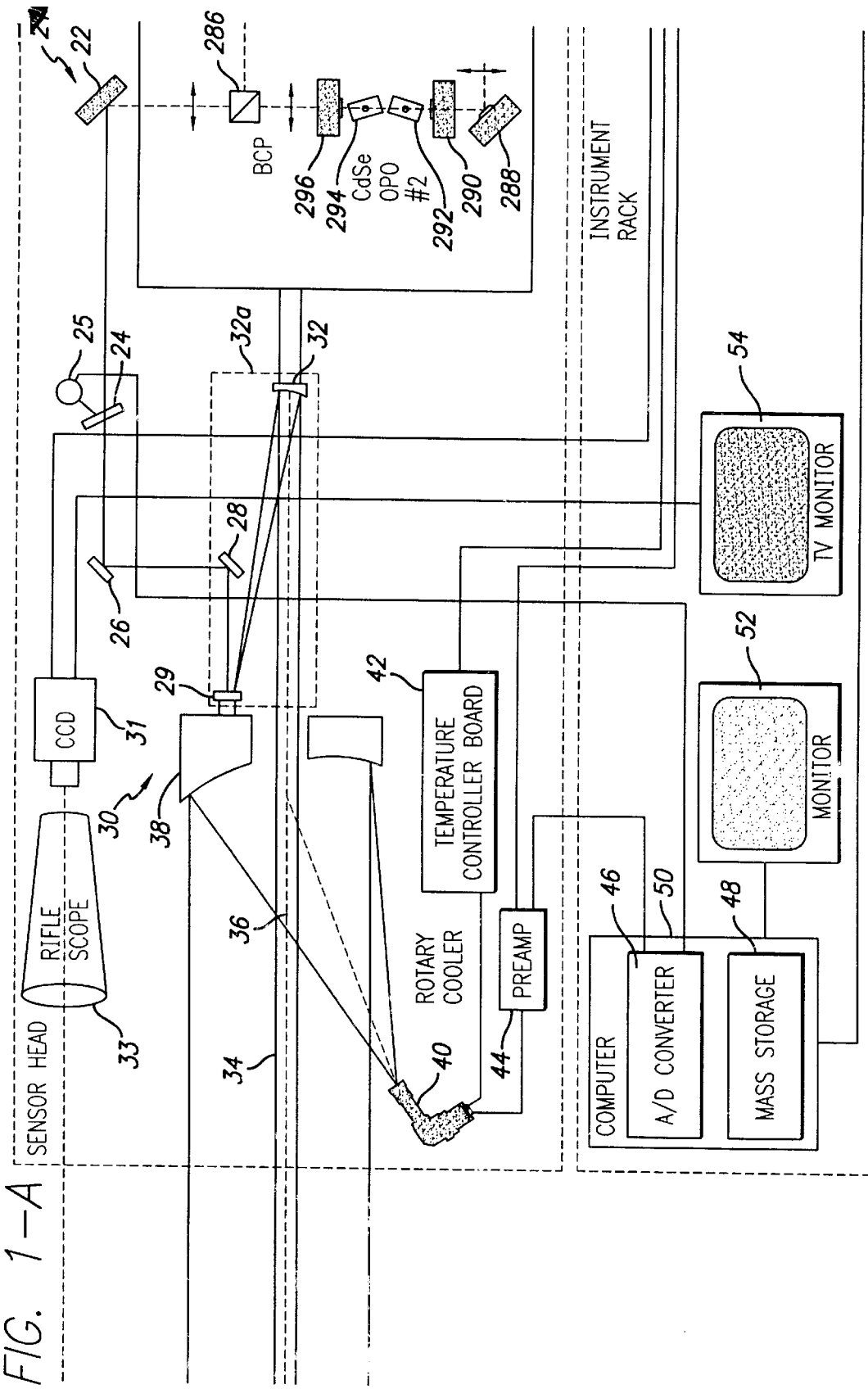
FIG. 1-A

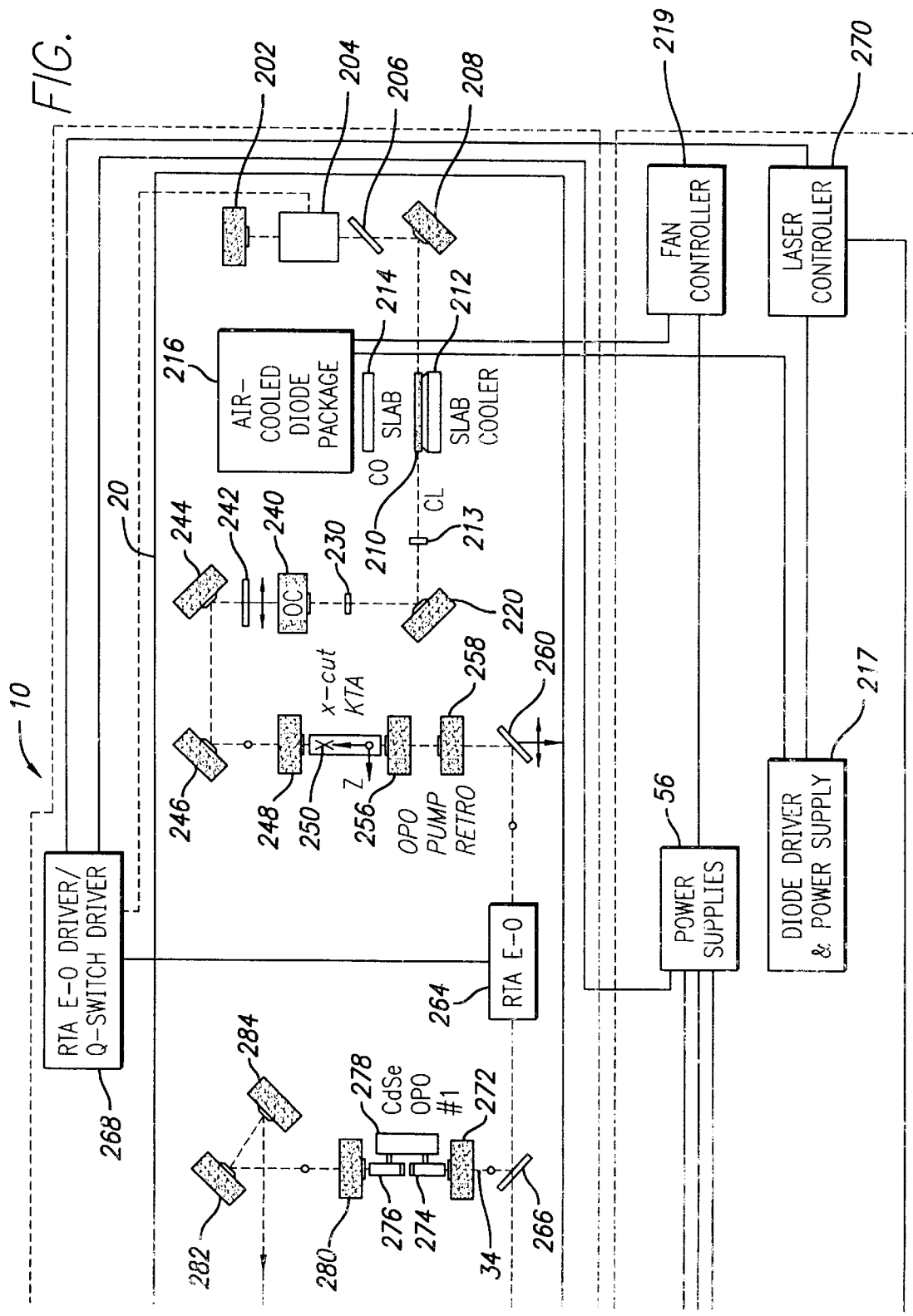
FIG. 1-B

VARIABLE PATH LENGTH PASSIVE Q SWITCH

CROSS-REFERENCE TO RELATED APPLICATIONS

This application is a continuation-in-part of U.S. patent application Ser. No. 09/478,229, entitled MONOLITHIC SERIAL OPTICAL PARAMETRIC OSCILLATOR filed Jan. 6, 2000, now U.S. Pat. No. 6,344,920 by J. M. Fukumoto. In addition, this application relates to copending applications Ser. No. 09/556,274 entitled SYSTEM AND METHOD FOR SENSING ATMOSPHERIC CONTAMINANTS USING TRANSMITTER WITH DUAL OPTICAL PARAMETRIC OSCILLATORS AND RECEIVER FOR SAME, filed Apr. 24, 2000 by J. M. Fukumoto

BACKGROUND OF THE INVENTION

1. Field of the Invention

The present invention relates to solid state lasers. More specifically, the present invention relates to solid state lasers operative in the 8–12 micron range.

2. Description of the Related Art

Lasers are currently widely used for communication, research and development, manufacturing, directed energy and numerous other applications. For certain applications, the nominal characteristic power output level of the laser is acceptable. However, for certain applications, it is desirable to optimize the output power of the laser. For this purpose, Q-switches have been used to Q-switch lasers and optimize the output energy thereof. Q-switches cause the energy of the laser to be contained within the lasing medium until a high density of excited states is achieved.

Many techniques have been developed to hold off lasing action. One approach involves use of an electro-optic (EO) Q-switch. The electro-optic Q-switch typically involves use of a thin film polarizer in the cavity which does not allow any other polarization to exit the laser except that which is p-polarized with respect to the thin film polarizer. The electro-optic Q-switch forces the beam in the cavity to the orthogonal polarization of the energy passed by the fixed polarizer until the target excited state is achieved. When the target state is achieved, a voltage is applied to the EO Q-switch. As a result, the switch is activated and changes the polarization of the beam to the state at which it is passed by the fixed polarizer.

Passive Q-switches absorb energy in the laser cavity at the lasing frequency. Hence, no lasing action occurs until (depending on the concentration and the path length of the switch) a state is reached at which the atoms of the switch can no longer absorb radiation. At this point, the switch becomes transparent and lasing action is allowed to occur.

Unfortunately, for certain applications, the weight, size, cost and power requirements associated with electro-optic Q-switches is such that these devices provide a suboptimal solution.

Passive Q-switches are generally of fixed thickness. Consequently, conventional passive Q-switches may provide only a fixed hold off of lasing action. Unfortunately, over time, the pump sources or the optical elements wear and the operating characteristics of the laser change. As is well known in the art, the hold off of the laser must be matched to its operating characteristics to achieve optimal performance.

Hence, a need exists in the art for a passive Q switch capable of providing variable hold off of lasing action for solid state and other lasers.

SUMMARY OF THE INVENTION

The need in the art is addressed by the passive Q-switch of the present invention. The inventive Q-switch includes a first wedge of material adapted to absorb electromagnetic energy. The first wedge has a first thickness on a first end thereof and a second thickness on a second end thereof diametrically opposite the first end. The first wedge has a first surface connecting the first and second ends and a second surface connected the first and second ends. The second surface is slanted relative to the first surface.

A second wedge of material is included in the inventive passive Q-switch. As per the first wedge, the second wedge has a first thickness on a first end thereof and a second thickness on a second end thereof diametrically opposite the first end. The second wedge has a first surface connecting the first and second ends and a second surface connecting the first and second ends. The second surface is slanted relative to the first surface. The second surface of the first wedge is mounted in optical alignment with the second surface of the second wedge and in a plane parallel thereto.

In the illustrative embodiment, the wedges are made of chromium:yttrium aluminum garnet ($Cr^{30\ 2}$:YAG) and mounted to allow the first and second wedges to translate relative to each other while maintaining a constant distant 'd' between the second surfaces thereof.

The inventive Q-switch allows for a variable thickness and lasing hold off in a passive arrangement.

BRIEF DESCRIPTION OF THE DRAWINGS

FIG. 1 is a block diagram of an illustrative implementation of a remote chemical sensing system incorporating the teachings of the present invention.

FIG. 3a show a side view of the switch.

FIGS. 3b and 3c depict side and top views, respectively, of a wedge of the passive Q switch of the present invention.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

FIG. 1 is a block diagram of an illustrative implementation of a remote chemical sensing system incorporating the teachings of the present invention. The system 10 includes a laser transmitter 20 which outputs a reference beam and a probe beam as discussed more fully below.

Figure 2:
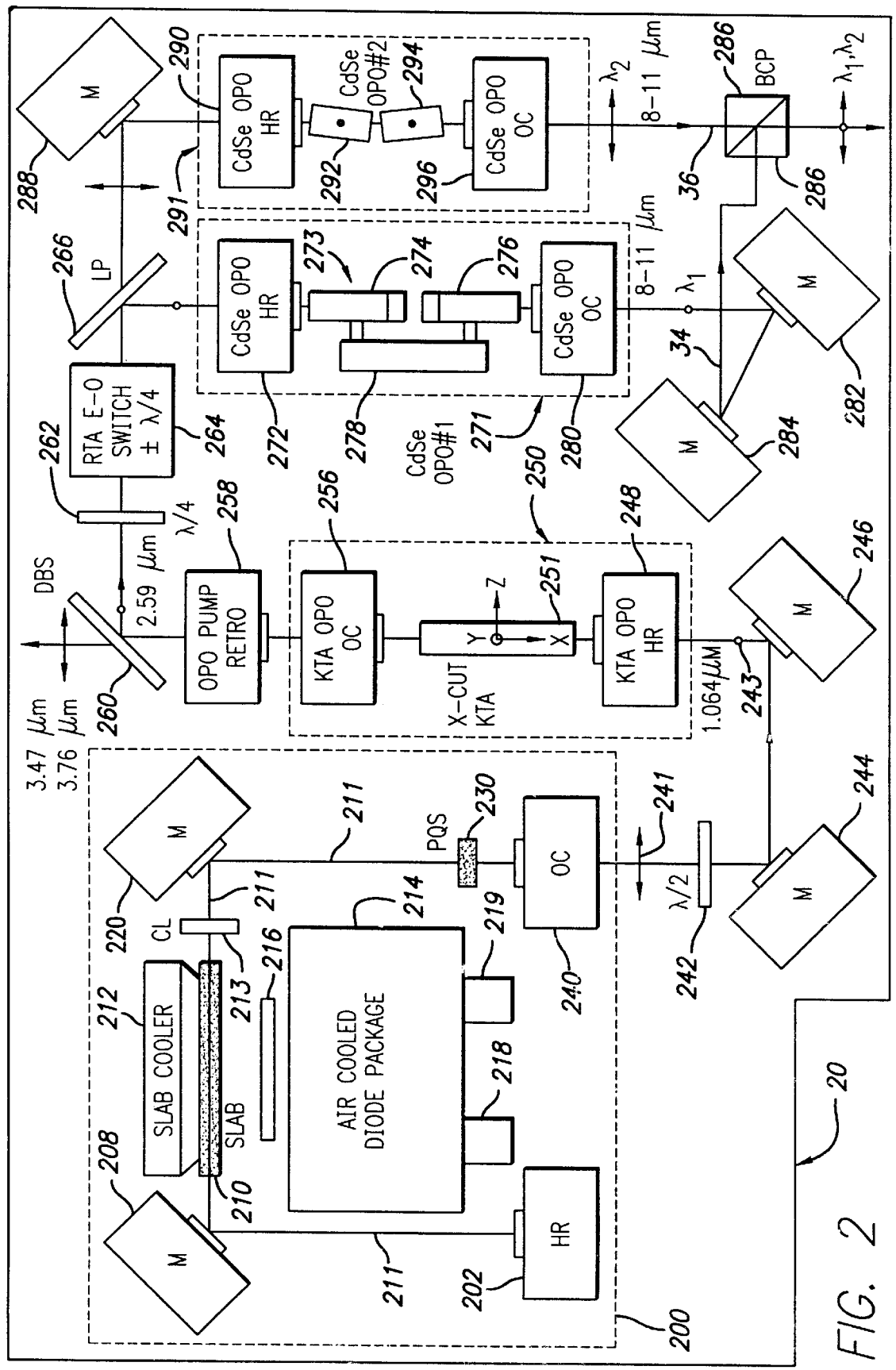
FIG. 2 is a block diagram of the laser transmitter of FIG. 1.

FIG. 2 is a block diagram of the laser transmitter of FIG. 1. The transmitter includes a diode pumped laser 200 having a rear high reflector 202. The gain medium for the laser is a neodymium YAG (Nd:YAG) slab 210. The oscillating beam 211 output by the slab 210 is directed to the rear high reflector 202 by a turning mirror 208.

As shown in FIG. 1, an electro-optic Q switch 204 and a linear polarizer 206 may be positioned between the rear high reflector 202 and the turning mirror 208. However, as discussed more fully below, in the best mode, a novel passive Q switch 230 can be used as an alternative. Accordingly, the electro-optic Q switch 204 and a linear polarizer 206 are shown in phantom in FIG. 1 to indicate that these elements are associated with an optional alternative implementation.

Returning to FIG. 2, in the preferred embodiment, the laser 200 is a neodymium YAG laser. The laser 200 can also use Nd:YLF or Nd:YVO$_4$ as the gain medium, depending on the particular pulse energy, pulse width, and pulse repetition rate required. A cooling block 212 is soldered to the Nd:YAG slab 210 to provide cooling as is common in the art. A cylindrical lens 213 is positioned in optical alignment with the slab 210 to optimize the profile of the beam output thereby. The slab 210 is pumped by an array of diodes (not shown) disposed in an air-cooled package 214. A collimated optic 216 is included for collimating and directing the output of the diodes into the laser slab 210 to achieve an optimal pump distribution. In the preferred embodiment, a collimating optic such as that disclosed and claimed in copending U.S. patent application Ser. No. 09/553,515 entitled SHAPING OPTIC FOR DIODE LIGHT SHEETS, filed Apr. 20, 2000 by J. M. Fukumoto et al., the teachings of which are incorporated herein by reference. Contacts 218 and 219 are provided for the package 214 as shown in the figure.

In the preferred embodiment, the oscillating beam of the slab 210 is directed by a second turning mirror 220 to an output coupler 240 via a passive Q switch 230 of novel design. The passive Q switch 230 is disclosed and claimed in copending U.S. patent application Ser. No. 09/563,073, entitled Variable Path Length Passive Q Switch, filed Apr. 24, 2000 by J. M. Fukumoto, the teachings of which are incorporated herein by reference.

Figure 3A:
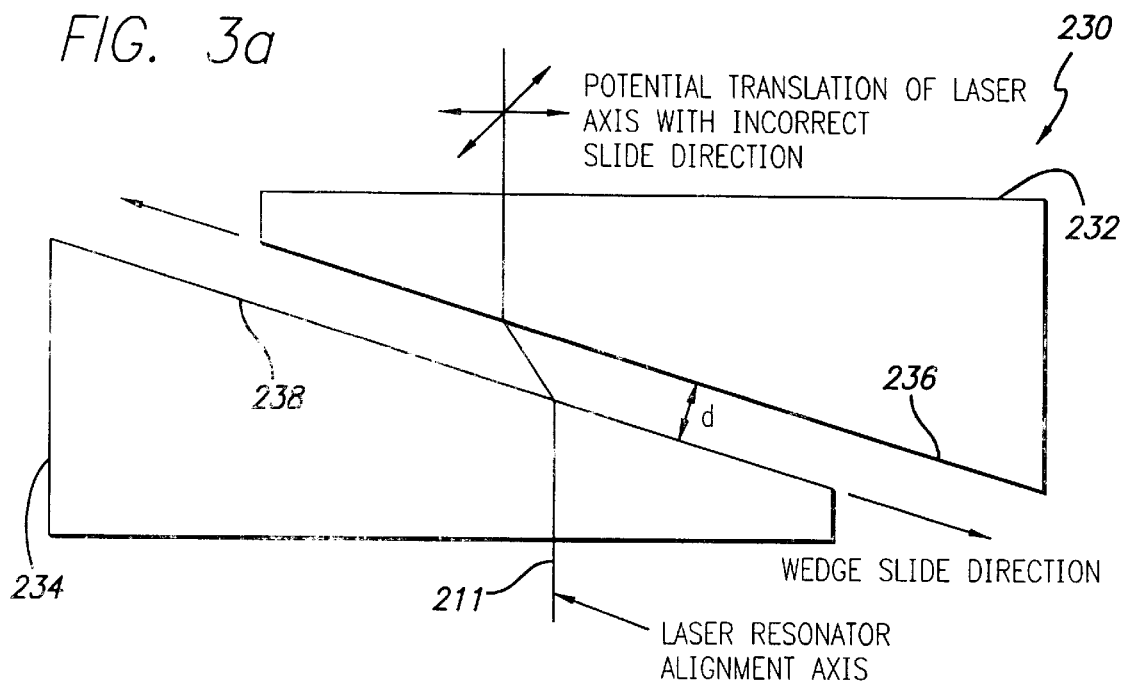
FIGS. 3a–c are diagrams which illustrate the design and operation of the passive Q switch utilized in preferred embodiment of the transmitter of FIG. 2.
Figure 3B:
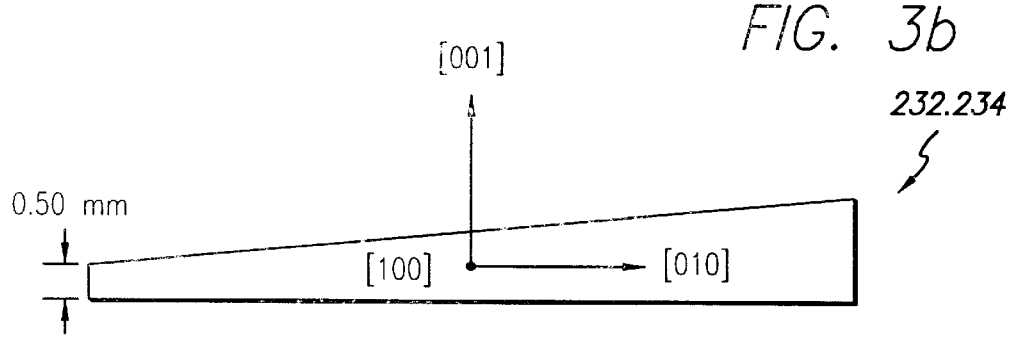
Figure 3C:
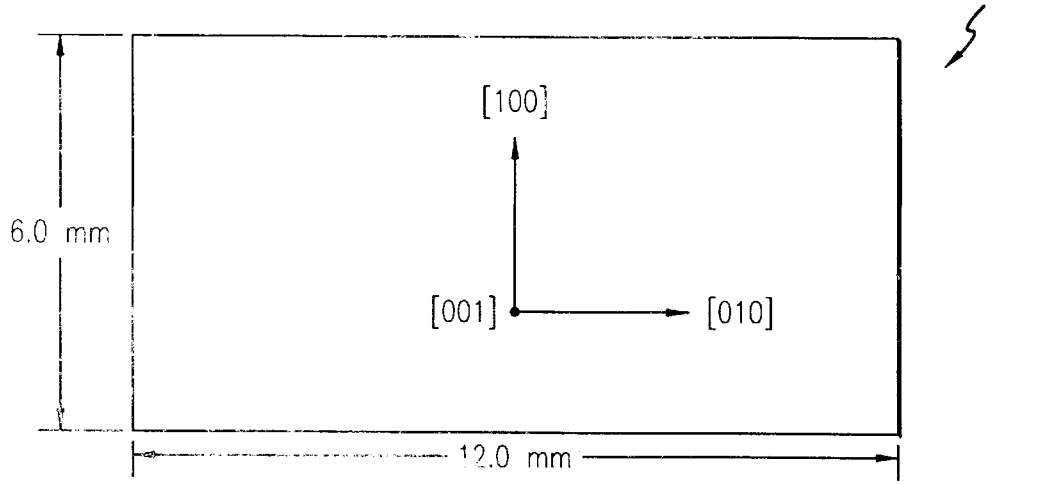

FIGS. 3a–c are diagrams which illustrate the design and operation of the passive Q switch utilized in preferred embodiment of the transmitter of FIG. 2. FIG. 3a shows a side view of the switch 230. In accordance with the present teachings, the switch 230 is implemented with first and second identical wedges 232 and 234. in the illustrative embodiment, each wedge is made of Cr$^{+2}$:YAG). As shown in FIG. 3a, the first wedge has a slanted surface 236 while the second wedge has a slanted surface 238. The wedges 232 and 234 are mounted to slide relative to each other in a plane parallel to plane of the slanted surfaces 236 and 238 thereof respectively. This sliding of the wedges has the effect of increasing the path length of the switch 230 with respect to the laser alignment axis 211 and beam. As is known in the art, the thickness of the switch 230 determines the laser's hold-off point thereof, i.e., the point at which the switch allows for the beam to pass therethrough. As is well known in the art, the Q switch 230 serves to ensure that the laser beam is output in a short duration pulse of energy.

The wedges 232 and 234 are translated by a suitable mechanical arrangement (not shown). For example, the wedges may be translated by solenoids (not shown) in response to a control signal from the laser controller 270 which is driven by the computer 50. By sliding the wedges 232 and 234 relative to each other, the thickness of the switch 230 may be adjusted. By keeping the wedge separation distance 'd' constant when sliding the wedges, the resonator alignment axis of the beam 211 remains unchanged. This may be important for resonators using curved mirror surfaces sensitive to resonator axis translations. The arrangement of the present invention allows for maintaining precise alignment of the resonator axis while varying the path length, and hence hold-off, through the passive Q-switch material.

FIGS. 3b and 3c depict side and top views, respectively, of a wedge of the passive Q switch of the present invention. FIGS. 3b and 3c show dimensions of the passive Q switch 230 of the illustrative embodiment. Note that the wedge fabrication specifically calls out crystal orientations in order to provide optimum Q switch performance. The laser polarization should be parallel to the [010] axis for best performance. The wedges should be polished and anti-reflection coated in order to minimize the Fresnel losses from the four surfaces.

Returning to FIG. 2, those skilled in the art will recognize the laser 200 as extending from the high reflector 202 to the output coupler 240. In the figures, the short line segment with double arrowheads 241 indicates horizontal polarization and the circle 243 indicates vertical polarization of the beam. The horizontally polarized output from the laser is rotated to the vertical by a half waveplate 242 ($\lambda$/2) so that the KTA OPO output at 2.59 $\mu$m is vertically polarized for processing by the optical parameter oscillator 250 as discussed more fully below. (This allows high reflectivity of the 2.59 $\mu$m wave and wavelength separation of the p-polarized 3.47 $\mu$m and 3.76 $\mu$m waves at the dichroic beamsplitter (DBS) 260 below.)

Third and fourth turning mirrors 244 and 246 direct the vertically polarized beam output by the laser to the first optical parametric oscillator (OPO) 250. As described more fully in the above-identified parent application (U.S. patent application Ser. No. 09/478,229, entitled MONOLITHIC SERIAL OPTICAL PARAMETRIC OSCILLATOR filed Jan. 6, 2000, by J. M. Fukumoto, the OPO 250 is comprised of an x-cut crystal 251 of potassium titanyl arsenate (KTA), or other suitable material, as a non-linear medium, together with a rear high reflector 248 and output coupler 256. In a standard configuration, the crystal 251 is placed between the high reflector 248 and the output coupler 256. The first OPO 250 can also be operated as an intracavity element to the Nd:YAG laser (not shown) with suitable mirror coatings for the laser and OPO. The OPO serves to shift the frequency of the beam output by the laser 200 from 1.064 microns to 2.59 microns in the illustrative embodiment.

An OPO pump retro-reflector 258 is a high reflector mirror that reflects the unconverted 1.06 micron energy from the OPO 250 back to the OPO 250, such that it has two passes through the crystal 250 for additional nonlinear gain, and passes energy at 2.59 microns.

A polarization and frequency selective dichroic beamsplitter (DBS) 260 transmits secondary emissions from the OPO 250 at 3.47 microns and 3.76 microns and reflects energy at 2.59 microns to a quarter-wave plate 262. One of ordinary skill in the mirror manufacture art would be able to construct the DBS 260 without undue experimentation. The DBS should be highly reflective to s-polarized light at 2.59 $\mu$m at 45° incidence angle and highly transmissive to wavelengths longer than 3.1 $\mu$m for p-polarized light at 45° incidence angle.

The 2.59 $\mu$m wave is passed through a $\lambda$/4 plate 262 and an RTA electro-optic switch 264 in order to maintain the vertical polarization or to rotate it by 90° so that the 2.59 μm wave can be steered to either of two cadmium selenide (CdSe) optical parametric oscillators as discussed more fully below. This polarization switching can be done at near megahertz repetition rates depending on the repetition rate of the laser. Employing a fixed λ/4 plate before the switch 264 allows the switch 264 to operate at alternating + and − voltages so that the average voltage on the switch is zero. In addition, lower λ/4 voltages can be used to avoid breakdown. The switch 264 rotates the plane of polarization in response to a voltage applied by a driver circuit 268 of FIG. 1 under command of a laser controller 270.

A thin film linear polarizer 266 is included to transmit horizontally polarized light and reflect vertically polarized light at 2.59 μm. This is effective to create the reference and probe beams 34 and 36, respectively, as discussed more fully below. The thin film polarizer 266 is fabricated in such a manner as to highly reflect s-polarized 2.59 μm light and highly transmit p-polarized 2.59 μm light. Using the switch 264 and the polarizer 266, the single wavelength converted beam from the laser 200 is used to create the reference beam 34 and the probe beam 36 and to rapidly switch therebetween.

The reference beam is generated by a second OPO assembly 271, while the probe beam 36 is generated by a third OPO 273. In combination with the first stage OPO 250, the second stage OPOs (271 and 273) provide tunable output in the 8–12 micron range. The operation of the first and second stage OPOs are best described with reference to the drawing of FIG. 4.

Figure 4:
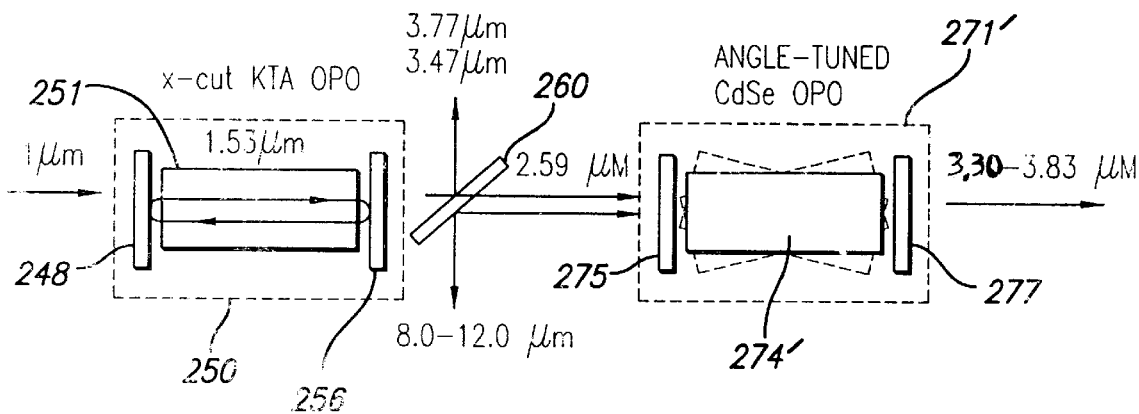
FIG. 4 is a simplified diagram illustrative of the operation of the solid state lasers utilized in the transmitter of the present invention.

FIG. 4 is a simplified diagram illustrative of the operation of the first and second stage OPOs utilized in the transmitter of the present invention. At the outset, it should be noted that FIG. 4 is illustrative of the operation of the first and second stage OPOs with the exception that the desired primary beam at 8–12 microns is shown exiting the rear of the crystal 274'. As discussed more fully below, this arrangement is useful to provide angle tuning without beam displacement with a single crystal. Accordingly, the reflectors are numbered 275 and 277 in FIG. 4 to illustrate that the figure depicts an alternative single crystal arrangement for the first and the second stage OPOs. Hence, the function of the reflectors 275 and 277 in FIG. 4 is implemented by the reflectors 272/280 and 290/296 of FIG. 2.

In any event, as shown in FIG. 4, the first stage OPO 250 (using x-cut KTA in the illustrative embodiment) receives the pump beam (at 1.064 micron in the illustrative embodiment) from the laser 200 and outputs a beam (at 2.59 microns) as discussed above. This beam (at 2.59 microns) serves to pump the crystal 274' of the second stage OPO 271' such that it emits a primary beam along with a secondary emission. In the illustrative embodiment, the crystals 273 and 291 are of cadmium selenide construction which outputs a primary beam at 8–12 microns with a secondary emission in the range 3.3 to 3.8 microns in response to a pump beam at 2.59 microns. KTA OPO mirror reflectivities must be maintained to tight specifications to generate the desired beams efficiently as will be appreciated by one of ordinary skill in the art.

Those skilled in the art will appreciate that in FIG. 4, the forward emission of the beam in the range of 3.3 to 3.8 microns and the backward emission of the 8–12 micron beam is a result of the coatings on the reflectors 275 and 277. One skilled in the art would appreciate that these mirrors could be coated to output the beam desired for a given application (e.g. the 8–12 micron beam) in an optimal direction for a given application and layout without departing from the scope of the present teachings. However, the direction of the beam will affect its displacement as the crystal is tuned as discussed below.

That is, a tilting of the crystal, as depicted in FIG. 2, results in a corresponding change in the wavelength of the output beam. Hence, the OPO may be tuned continuously by tilting the crystal. However, the tilting of the crystal will also result in a displacement of the beam output in the forward direction, i.e. the 3.3–308 micron beam in FIG. 2. However, the primary beam output in the reverse direction (i.e., the beam at 8–12 microns) will not be displaced because this beam is reflected by the second mirror 277 and therefore retraces its path through the crystal. Hence, the effect a displacement in one direction is countered by a corresponding displacement in the opposite direction as the beam retraces its path.

When it is desired to output a spatially stable beam in a forward direction, each crystal 273 and 291 may be segmented into two smaller identical crystals 274/276 and 292/294 respectively. The crystals 274, 276, 292 and 294 are pivotally mounted. The two crystals in each set 274/276 and 292/294 are tilted in opposite directions as shown in FIG. 2. This novel arrangement provides angle tuning without beam displacement. Actuators 278 (shown) and 293 (not shown) provide angle tuning in FIG. 2 in response to the laser controller 270.

Note that in FIG. 2, the first crystal set 273 is seen from a side view while the second crystal set 291 is seen from a top view. This orientation is necessary because, in the illustrative embodiment, the reference beam 34 is vertically polarized and the probe beam is horizontally polarized and the optical parametric oscillators are polarization selective. The two second stage OPO outputs are made precisely co-linear by two final tuning mirrors 282 and 284 and a beam combining prism (BCP) 286.

In accordance with the present teachings, the reference beam is selected to be 'out-of-band' with respect to a chemical to be sensed in the atmosphere while the probe beam is 'in-band'. That is, since the spectra of major chemical agents is known in the 8–11 μm region, probing for a specific agent first requires in-band and out-of-band wavelength setting of the second stage CdSe OPOs. This wavelength setting can be accomplished by a relatively slow and small electro-mechanical motor, or can be manually set to predetermined angular positions.

Once the second stage OPOs are set to their respective wavelengths (λ1, λ2), the laser 200 and RTA switch 264 can be fired to produce rapidly alternating λ1, λ2 output wavelengths. A major advantage of this approach is that rapidly alternating wavelengths can be produced without the necessity of rapidly rotating crystals, as would be required for angle tuning using one second stage OPO. In addition, vibration isolation of a rapidly oscillating crystal(s) would be a significant concern in a platform that required interferometric stability, such as that of the transmitter laser. Finally, near megahertz switching rates, if required, would be exceeding difficult or impossible to implement mechanically, due to the mass, angular position accuracy, and angular velocity required to angle tune the CeSe crystals at these rates.

Returning to FIG. 1, the beams output by the transmitter 20 are directed by an optical arrangement 21 including a first mirror 22, a sampling beamsplitter 24, a second mirror 26, a third mirror 28, a convex mirror 29 and a concave mirror 32. The convex mirror 29 and concave mirror 32 comprise an off-axis parabolic expansion telescope 32a for the output beam. The optical arrangement 21 outputs the probe beam 34 and a reference beam 36 through an aperture 37 in a single element, off-axis paraboloid 38. Reflections of the probe and reference beams return to the system 10 and are received and focused by the paraboloid 38 onto a detector 40.

As mentioned above, the probe beam 36 is in the absorption band of chemical contaminants while the reference beam is out of band. A difference in the return signals for the two beams will indicate whether a chemical cloud is present in the path of the probe beam. That is, if a chemical contaminant cloud is present, it will selectively absorb energy from the in-band probe beam 34, and will subsequently reduce the reflected probe beam energy sensed at the detector 40. In contrast, the reference beam 36 which is not absorbed by the cloud, will be reflected back to the detector 40 without suffering significant attenuation.

In the illustrative embodiment, the detector 40 is a mercury cadmium telluride (HgCdTe) detector. Nonetheless, those skilled in the art will appreciate that the present invention is not limited to the detector technology employed.

Figure 5:
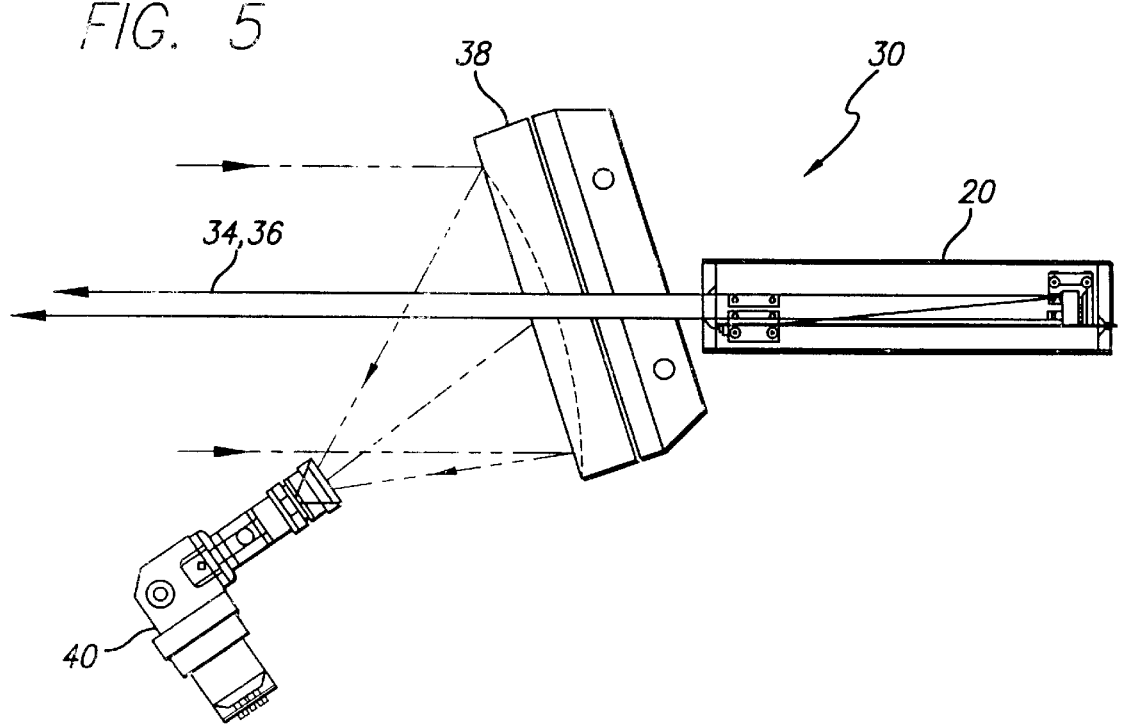
FIG. 5 is a diagram showing the receiver of the system of FIG. 1 in greater detail.

FIG. 5 is a diagram showing the receiver in greater detail. As shown in FIG. 5, the receiver 30 consists of the single element, off-axis paraboloid 38 which is focused onto the cryogenically cooled detector 40. The detector element 40 is a single 0.5 mm diameter HgCdTe element mounted in a rotary cooler. In the preferred embodiment, the microcooler is an integral Stirling engine with the detector directly mounted to the cold finger.

To eliminate the effects of parallax and pointing complexities with separate receiver and transmitter apertures, a hybrid coaxial design is utilized as shown in FIG. 5. A central obscuration of less than 0.5 percent in area is realized from this design and simplifies pointing the sensor unit. An afocal design using two off-axis parabolic sections forms the transmitter beam expander assembly 32a. In the preferred embodiment, the 0.5 mm diameter transmitter beam is expanded 13 times to reduce transmitter divergence to 3 mR. In the preferred embodiment, the receiver and transmitter mirror designs are fabricated from 6061-T6 aluminum alloy and coated with gold for high reflectivities at the 8–12 μm band.

Transmitted energy is measured by sampling a fraction of the laser output with a room temperature HgCdZnTe photodetector 25. Sampling is accomplished by reflection from a beamsplitter surface 24 positioned upstream from the transmitter beam expander assembly 32a.

Returning to FIG. 1, the temperature of the detector 40 is controlled by a conventional temperature controller 42. Detector signals, power and command signals are routed to the sensor head through a umbilical from an instrument rack. The detector 40 outputs a number of electrical signals which are amplified by a preamplifier 44 and digitized by an analog-to-digital (A/D) converter 46. In the illustrative implementation, the A/D conversion is implemented in a computer 50 having memory 48. Those skilled in the art will appreciate that the present teachings are not limited to the signal processing system shown in FIG. 1. Data acquisition is accomplished by conventional concentration-pathlength (CL) measurements of clouds using returns off of topographic targets. Intensity comparison measurements of the transmitted beam and the received energy are calculated for each laser firing.

Any analog, digital, optical or hybrid circuit may be used to process the signals received by the system 10 without departing from the scope of the present teachings. The computer 50 outputs to a computer monitor 52 or a television monitor 54. The computer may be programmed to process the return signals to extract range data with respect to a cloud of contaminants.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A passive Q switch comprising:
   a first wedge of material including means for absorbing electromagnetic energy, said first wedge having a first thickness on a first end thereof, a second thickness on a second end thereof diametrically opposite said first end, a first surface connecting said first and second ends and a second surface connecting said first and second ends, said second surface being slanted relative to said first surface; and
   a second wedge of material including means for absorbing electromagnetic energy, said second wedge having a first thickness on a first end thereof, a second thickness on a second end thereof diametrically opposite said first end, a first surface connecting said first and second ends and a second surface connecting said first and second ends, said second surface being slanted relative to said first surface; and
   means for mounting said second surface of said first wedge in optical alignment with said second surface of said second wedge and in a plane parallel thereto, said means for mounting further including means for allowing said first and second wedges to translate relative to each other while maintaining a constant distant 'd' between said second surfaces thereof.

2. The invention of claim 1 wherein said wedges are made of chromium:yttrium aluminum garnet ($Cr^{+2}$:YAG).

3. A passive Q-switch comprising:
   a first wedge of material including means for absorbing electromagnetic energy, said first wedge having a first thickness on a first end thereof, a second thickness on a second end thereof diametrically opposite said first end, a first surface connecting said first and second ends and a second surface connecting said first and second ends, said second surface being slanted relative to said first surface;
   a second wedge of material including means for absorbing electromagnetic energy, said second wedge having a first thickness on a first end thereof, a second thickness on a second end thereof diametrically opposite said first end, a first surface connecting said first and second ends and a second surface connecting said first and second ends, said second surface being slanted relative to said first surface;
   means for mounting said second surface of said first wedge in optical alignment with said second surface of said second wedge and in a plane parallel thereto, said means for mounting further including means for allowing said first and second wedges to translate relative to each other while maintaining a constant distant 'd' between said second surfaces thereof; and means for translating said wedges relative to each other while maintaining a constant distant 'd' between said second surfaces thereof.

4. The invention of claim 3 wherein said wedges are made of chromium:yttrium aluminum garnet ($Cr^{+2}$:YAG).

5. A method for Q-switching a laser including the steps of:

providing a first wedge of material including means for absorbing electromagnetic energy, said first wedge having a first thickness on a first end thereof, a second thickness on a second end thereof diametrically opposite said first end, a first surface connecting said first and second ends and a second surface connecting said first and second ends, said second surface being slanted relative to said first surface;

providing a second wedge of material including means for absorbing electromagnetic energy, said second wedge having a first thickness on a first end thereof, a second thickness on a second end thereof diametrically opposite said first end, a first surface connecting said first and second ends and a second surface connecting said first and second ends, said second surface being slanted relative to said first surface;

mounting said second surface of said first wedge in optical alignment with said second surface of said second wedge and in a plane parallel thereto; and translating said wedges relative to each other while maintaining a constant distant 'd' between said second surfaces thereof.

* * * * *